United States Patent
Bruening et al.

(10) Patent No.: US 6,232,265 B1
(45) Date of Patent: May 15, 2001

(54) PARTICULATE SOLID SUPPORTS FUNCTIONALIZED WITH POLYHYDROXYPYRIDINONE LIGANDS

(75) Inventors: Ronald L. Bruening; Krzysztof E. Krakowiak, both of American Fork, UT (US)

(73) Assignee: IBC Advanced Technologies, Inc., American Fork, UT (US)

( * ) Notice: Subject to any disclaimer, the term of this patent is extended or adjusted under 35 U.S.C. 154(b) by 0 days.

(21) Appl. No.: 09/330,477

(22) Filed: Jun. 11, 1999

(51) Int. Cl.$^7$ .............................. B01J 20/22; B01J 20/10; B01J 20/12; B01D 39/00; B01D 15/08

(52) U.S. Cl. .......................... 502/401; 502/402; 502/407; 502/415; 210/198.2; 210/502.1; 210/679; 210/681; 210/682

(58) Field of Search ..................................... 502/400, 401, 502/402, 407, 415; 210/198.2, 502.1, 679, 681, 682

(56) References Cited

U.S. PATENT DOCUMENTS

| | | |
|---|---|---|
| 4,698,431 | 10/1987 | Raymond et al. . |
| 4,943,375 | 7/1990 | Bradshaw et al. . |
| 4,952,321 | 8/1990 | Bradshaw et al. . |
| 4,959,153 | 9/1990 | Bradshaw et al. . |
| 4,960,882 | 10/1990 | Bradshaw et al. . |
| 5,039,419 | 8/1991 | Bradshaw et al. . |
| 5,071,819 | 12/1991 | Tarbet et al. . |
| 5,078,978 | 1/1992 | Tarbet et al. . |
| 5,084,430 | 1/1992 | Tarbet et al. . |
| 5,120,443 * | 6/1992 | Bruening et al. ............ 210/638 |
| 5,173,470 | 12/1992 | Bruening et al. . |
| 5,175,110 * | 12/1992 | Bradshaw et al. ............ 436/77 |
| 5,179,213 | 1/1993 | Bradshaw et al. . |
| 5,182,251 | 1/1993 | Bruening et al. . |
| 5,190,661 | 3/1993 | Bruening et al. . |
| 5,244,856 | 9/1993 | Bruening et al. . |
| 5,273,660 | 12/1993 | Bruening et al. . |
| 5,393,892 | 2/1995 | Krakowiak et al. . |
| 5,624,901 | 4/1997 | Raymond et al. . |
| 6,071,416 * | 6/2000 | Bruening et al. ............ 210/670 |
| 6,139,751 * | 10/2000 | Bogaert et al. ............ 210/679 |

OTHER PUBLICATIONS

J.R. Telford and K.N. Raymond; Comprehensive Supramolecular Chemistry, vol. 10, Ed. by D.N. Reinhoudt, Pergamon Press, 1996, pp. 245–266, Month N/A.

K.N. Raymond; Ferric Ion Sequestering Agents. 13. Synthesis, Structures, and Thermodynamics og Complexion of Cobalt (III) and Iron (III) Tris Complexes of Several Chelating Hydroxypyridinones; Inorganic Chemistry, vol. 24, 1985, pp. 954–967, Month N/A.

P.D. Taylor; Novel 3–Hydroxy–2(1H)–pyridinones. Synthesis, Iron(III)–Chelating Properties, and Biological Activity; Journal of Medicinal Chemistry, vol. 33, 1990, pp. 1749–1755, Month N/A.

K.N. Raymond; Specific Sequestering Agents for the Actinides. 21. Synthesis and Initial Biological Testing of Octadenate Mixed Catecholate–Hydroxypridinonate Ligands, Journal of Medicinal Chemistry, vol. 36, 1993; pp. 504–509, Month N/A.

Jide Xu, Sonya J. Franklin, Donald W. Whisenhunt, Jr., & Kenneth N. Raymond;Gadolinium Complex of Trist [(3–hydroxy–1–methyl–2–oxo–1, 2–didehydropyridine–4–carboxamido)ethyl]–amine: A New Class of Gadolinium Magnetic Resonance Relaxation Agents, Journal of the American Chemical Society, vol. 117, 1995, pp. 7245–7246, Month N/A.

\* cited by examiner

*Primary Examiner*—Mark L. Bell
*Assistant Examiner*—Patricia L. Hailey
(74) *Attorney, Agent, or Firm*—Thorpe North & Western

(57) ABSTRACT

Compositions and methods for selectively binding metal ions from a source solution comprise using a polyhydroxypyridinone-containing ligand covalently bonded to a particulate solid support through a hydrophilic spacer of the formula SS-A-X-L(HOPO)$_n$,
where SS is a particulate solid support such as silica or a polymeric bead, A is a covalent linkage mechanism, X is a hydrophilic spacer grouping, L is a ligand carrier, HOPO is a hydroxypyridinone appropriately spaced on the ligand carrier to provide a minimum of six functional coordination metal binding sites, and n is an integer of 3 to 6 with the proviso that when SS is a particulate organic polymer, A-X may be combined as a single covalent linkage. The separation is accomplished by passing a source solution containing the ions to be separated through a column containing the particulate composition, causing the selected ions to be complexed to the HOPO ligands and subsequently removing the selected ions from the column by passing an aqueous receiving solution through the column and quantitatively stripping the selected ions from the HOPO ligand.

13 Claims, No Drawings

PARTICULATE SOLID SUPPORTS FUNCTIONALIZED WITH POLYHYDROXYPYRIDINONE LIGANDS

BACKGROUND OF THE INVENTION

Effective methods for the recovery and/or separation of particular ions such as the transition, post-transition, lanthanide and radioactive actinide metal ions from solution mixtures of these and other metal ions, are of great importance in modern technology. It is particularly difficult to remove these particular metal ions in the presence of moderate to strong acids and soluble complexing or chelating agents, such as the halide ions, which have a high affinity for the desired metal ions. It is also difficult to remove the mentioned desired metal ions when they are present at low concentrations in solutions containing other metal ions at much greater concentrations. Hence, there is a real need for a process to selectively concentrate certain transition, post-transition, lanthanide and actinide metal ions when present at low concentrations and in the presence of acid solutions and other complexing agents.

It is known that siderophores (compounds manufactured by microorganisms to sequester $Fe^{3+}$ ions) are commonly composed of hydroxamate- and catecholate-containing molecules. Formulas 1 and 2 show these structures.

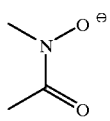

Formula 1

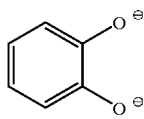

Formula 2

A modern review of the siderophores is found in an article by J. R. Telford and K. N. Raymond, "Comprehensive Supramolecular Chemistry," vol. 10, Ed. by D. N. Reinhoudt, Pergamon Press, 1996, pp. 245–266. Many synthetic iron chelating agents have been prepared in an effort to find pharmaceutical compounds that will increase the excretion of iron from iron-overloaded patients. Some of the synthetic chelating agents contain the hydroxypyridinone structure as depicted by 3-hydroxy-2(1H)-pyridinone (Formula 3), 1-hydroxy-2(1H)-pyridinone (Formula 4), and 3-hydroxy-4(1H)-pyridinone (Formula 5).

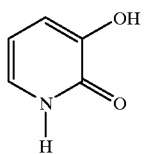

Formula 3

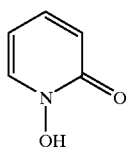

Formula 4

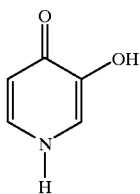

Formula 5

These chelating agents often have other substituents, such as carboxyl groups in positions 3, 4, 5, or 6 of the compound in Formula 4 or alkyl and carboxymethyl groups on the nitrogen atoms of the compounds in Formulas 3 and 5. These hydroxypyridinone structures are excellent complexing agents for $Fe^{3+}$ because the pyridone carbonyl oxygen atoms withdraw electron density and have a partial negative charge as shown in the resonance structures for 1-hydroxy-2(1H)-pyridinone below.

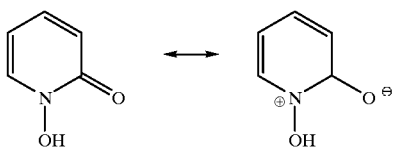

Equation 1

Thus, these materials resemble the hydroxamate molecules that have a high affinity for $Fe^{3+}$. The synthesis and $Fe^{3+}$ ion-complexing properties of these types of compounds are found in the article by K. N. Raymond and his coworkers, "Ferric Ion Sequestering Agents. 13. Synthesis, Structures, And Thermodynamics of Complexation of Cobalt(III) And Iron(III) Tris Complexes of Several Chelating Hydroxypyridinones," Inorganic Chemistry, Volume 24, 1985, pp. 954–967; and in the article by P. D. Taylor and his Coworkers, "Novel 3-hydroxy-2 (1H)-pyridinones. Synthesis, Iron(III)-chelating Properties And Biological Activity," Journal of Medicinal Chemistry, Volume 33, 1990, pp. 1749–1755. K. N. Raymond and his coworkers have found that having more than one of these chelating groups bonded to a polyamine such as 1,5,10,14-tetraazatetradecane improves their affinity for $Fe^{3+}$ and allows complex formation with the actinides. Bonding to the polyamine is through the formation of amide bonds as shown in following Formula 6.

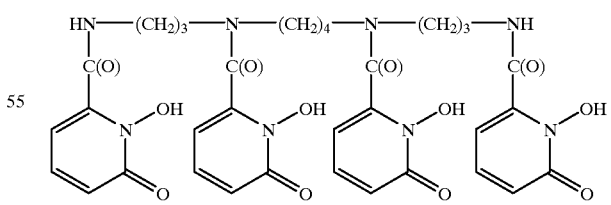

Formula 6

The octadentate ligand shown above in Formula 6 has a high affinity for Fe(III), Am(III), Pu(IV) and Np(V) as reported in articles by K. N. Raymond and coworkers, "Specific Sequestering Agents For The Actinides. 21. Synthesis And Initial Biological Testing of Octadentate Mixed Catecholate-hydroxypyridinoate Ligands," Journal of Medicinal Chemistry, Volume 36, 1993, pp. 504–509; and "In Vivo Chelation of Am(III), Pu(IV), Np(V) And U(VI) in Mice by Tren-(Me-3,2-HOPO)," Radiation Protection Dosimetry, Volume 53, pp. 305–309. A similar polyamine material containing three Formula 3 HOPO molecules formed strong interactions with gadolinium, calcium and zinc as shown in the article by J. Xu, S. J. Franklin, D. W. Whisenhunt, Jr., and K. N. Raymond, "Gadolinium Complex of Tris[(3-hydroxy-1-methyl-2-oxo-1,2-didehydropyridine-4-carboxamido)ethyl]amine: A New Class of Gadolinium Magnetic Resonance Relaxation Agents," Journal of the American Chemical Society, Volume 117, 1995, pp. 7245–7246. The synthesis of hydroxypyridinonate chelating agents, such as that shown above in Formula 6, is shown by Raymond et al., U.S. Pat. No. 4,698,431, issued Oct. 6, 1987. The materials described in this patent and the above cited articles are directed only to the hydroxypyridonate molecules or those bound to simple amines. Attachment of from one to four HOPO rings to a molecular or polymeric backbone through amide linkages is taught by Raymond et al., U.S. Pat. No. 5,624,901, issued Apr. 29, 1997. At least one of the HOPO rings must be a 3,2-HOPO ligand. Tetra-, hexa- and octadentate ligands (i.e. two to four HOPO substituents) are illustrated being attached to a polyamine linking backbone. There is also an allegation that a polymeric backbone, such as poly (styrenedivinylbenzene), agarose and polyacrylamide, having amine functionalities, can be used to which a HOPO substituent can be directly bonded via an amide-type linkage. There is no teaching or suggestion that a tetra-, hexa- or octadentate HOPO ligands, attached to a backbone carrier, can be covalently attached to a polymeric or inorganic solid support through the backbone carrier by appropriate linkage means.

The ability to complex $Fe^{3+}$, $Pu^{4+}$, $Th^{4+}$, $Zr^{4+}$, lanthanides, actinides and other metal ions under increasing acidities and competing matrix complexers or chelants requires the interactive strength of six to eight donor atoms, of which there are two per HOPO ring, and the proper molecular spacing of these HOPO rings. The ability to use this interactive strength to perform an actual separation requires that three or more HOPO moieties with appropriate molecular spacing be attached via a stable covalent bond to a solid support in such a manner that the HOPO moieties cooperate in such a manner to maximize their collective binding abilities.

SUMMARY OF THE INVENTION

The present invention provides a composition and method for the removal of desired transition, post-transition, actinide and lanthanide metal ions present in low concentrations from a solution utilizing compositions comprising three or more hydroxylpyridinonate (HOPO) containing ligands the composite of which are appropriately spaced so as to contain the interactive strength of six or more coordination binding sites, preferably six to eight. The HOPO containing ligands are covalently bonded to a particulate solid support via an appropriate hydrophilic hydrocarbon spacer.

This invention also provides a composition and method of maximizing the complexing abilities of ligands containing three or more HOPO binding moieties by the preparation of ligands wherein the HOPO moieties are properly spaced on a ligand carrier and the ligand is attached to an inorganic or organic particulate solid support via an appropriate hydrophilic hydrocarbon spacer.

The compositions of the present invention comprise suitable ligands containing three or more HOPO groups, such as the HOPO groups noted above, which are covalently bonded through a hydrophilic spacer grouping to a silicon, carbon, nitrogen, oxygen or sulfur atom and further covalently bonded to a particulate inorganic or polymeric organic solid support and are represented by the following Formula 7:

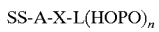

SS-A-X-L(HOPO)$_n$                              Formula 7 wherein SS is a solid support, A is a covalent linkage mechanism, X is a hydrophilic spacer grouping, and L(HOPO)$_n$ is a ligand comprising a ligand carrier L having bound thereto three or more HOPO groups, wherein the ligand carrier L is configured such that the HOPO groups are appropriately spaced on the ligand carrier to provide six or more functional coordination binding sites.

In the above Formula 7, n is an integer of at least three and may range from about 3 to 6. Preferably n is an integer of 3 or 4. Preferably, the HOPO groups are positioned on carrier L such that there are at least two and preferably at least four atoms on carrier L separating the attached HOPO groups to provide the appropriate stereoconfiguration to optimize the HOPO binding sites. When considering the atoms separating the HOPO groups, the hydrogen atom is not taken into consideration. When the ligand carrier L is non-cyclic the HOPO groups on the carrier will preferably be spaced apart by 4 to 6 atoms and when the ligand carrier is an amine the HOPO groups will separated by four or more non-hydrogen atoms. Preferably the carrier is a polyamine wherein an amine functionality on the ligand carrier interacts with an active functional group on the hydroxypyridinone to form a covalent bond. Representative ligand carriers illustrated in the examples below include members selected from the group consisting of tetrakis(aminomethyl)methane; tetrakis(5-amino-2-oxa-pentyl)methane; 25,26,27,28-tetrakis[(aminobutyl)oxy]calix[4]arene; 1,4,8,12-tetrazacyclopendadecane and triethylenetetraamine. The above ligand carriers are exemplary only and any carrier to which a HOPO moiety can be appropriately spaced and bonded, such that the metal coordination sites of the HOPO moiety can be utilized in ion binding, are within the scope of the invention.

Functional hydroxypyridinone structures are shown in Formulas 3, 4 and 5 and, regardless of their positions on the pyridinone ring, always comprise adjacent hydroxy and oxo groupings. This provides the HOPO group with a sequestering functionality similar to the siderophores shown in Formulas 1 and 2. Formula 3 shows a 3-hydroxy-2(1H)-pyridinone, Formula 4 shows a 1-hydroxy-2(1H)-pyridinone and Formula 5 shows a 3-hydroxy-4(1H)-pyridinone. In addition to the hydroxy and oxo functions, at least one other ring atom contains a functional grouping through which a covalent bond can be formed to attach the HOPO group to the ligand carrier to provide the overall multi HOPO containing ligand. Preferably, when attached to a carbon atom of the HOPO ring, the functional group will be a carboxylic acid group that will react through amidation or esterification with an amino or hydroxy group of the ligand carrier. When the functional group is attached to the nitrogen atom of the pyridinone ring it will preferably be an alkyl or carboxyalkyl group. Carboxylic acid functional groups that react with an amine function on the ligand carrier forming an amide bond are particularly preferred.

In order for the HOPO groups of the -L(HOPO)$_n$ portion of Formula 7 to function with optimal binding selectivity, it is important that the stereoconfiguration of the HOPO moieties be such that the coordination sites of each HOPO ring can function optimally for the binding and removal of the desired ions. At the same time, it is vital that the -L(HOPO)$_n$ functionality be firmly anchored to a solid support such that desired ions removed from solutions can be complexed to the binding ligands and then, optionally, subsequently released in such a manner that the binding/release process can be repeatedly utilized as desired. This is accomplished by means of a SS-A-X- portion of Formula 7.

The SS-A-X- portion of Formula 7 is well known for use with ion binding ligands. Preferably solid support "SS" is an inorganic and/or organic particulate support material selected from the group consisting of silica, silica gel, silicates, zirconia, titania, alumina, nickel oxide, glass beads, phenolic resins, polystyrenes and polyacrylates. However, other organic resins or any other hydrophilic organic and/or inorganic support materials meeting the above criteria can also be used.

The use of organic ion binding ligands attached to an SS-A-X- solid support by means of a covalent linkage spacer grouping is illustrated in U.S. Pat. Nos. 4,943,375; 4,952,321; 4,959,153; 4,960,882; 5,039,419; 5,071,819; 5,078,978; 5,084,430; 5,173,470; 5,179,213; 5,182,251; 5,190,661; 5,244,856; 5,273,660; and 5,393,892. These patents, which disclose various spacers that can be used in forming an organic ligand attached to a solid support, are incorporated herein by reference.

When the solid support SS is an inorganic material such as silica, silica gel, silicates, zirconia, titania, alumina, nickel oxide and glass beads the covalent linkage A is a silane such that A-X may be represented by the formula:

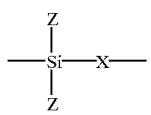

Formula 8 where X is a spacer grouping having the formula:

$(CH_2)_a(OCH_2CHR^1CH_2)_b$  Formula 9 wherein $R^1$ is a member selected from the group consisting of H, SH, OH, lower alkyl, and aryl; a is an integer from 3 to about 10; and b is an integer of 0 or 1. Each Z is independently selected from the group consisting of Cl, Br, I, lower alkyl, lower alkoxy, substituted lower alkyl or substituted lower alkoxy and S. As used herein, lower alkyl or lower alkoxy means a group having 1 to 8 carbon atoms.

When the particulate solid support (SS) is an organic resin or polymer, such as phenolic resins, polystyrenes and polyacrylates, it will generally be a hydrophilic polymer or polymer derivatized to have a hydrophilic surface and contain polar functional groups. The ligand $L(HOPO)_n$ will then generally contain a functional grouping reactive with an activated polar group on the polymer. The covalent linkage A and spacer X will then be integrated, and may actually be a single linkage, formed by the covalent bonding formed by the reaction between the activated polar group from the polymer and the functional group from the ligand and may be represented by formula:

Formula 10 where c is an integer of 0 or 1, d and e are independently integers between 0 and 10 and Y is a functional group or aromatic linkage such as an ether(O), sulfide(S), imine (C=N), carbonyl(CO), ester(COO), thioester(CSO), amide (CONH), thioamide(CSNH), amine(NH), lower alkylamine (NR), sulfoxide(SO), sulfone($SO_2$), sulfonamide($SO_2$NH), phenyl($C_6H_4$), benzyl($CH_2C_6h_4$), and the like. At least one of x, y or z must be 1.

It is to be emphasized that the present invention does not reside in the discovery of the SS-A-X- portion of Formula 7. Rather, it is the discovery that the ion-binding capabilities of the $L(HOPO)_n$ ligand, when attached to an SS-A-X based solid substrates, are optimized.

The properly spaced polyhydroxypyridinone ligands covalently bonded to solid supports as shown in Formula 7 are characterized by high selectivity for and removal and separation of desired metal ions or groups of desired metal ions, such as several transition, post-transition, lanthanide and actinide metal ions, including particularly $Fe^{3+}$, $Al^{3+}$, $Zr^{4+}$, $Th^{4+}$, $Pu^{4+}$, $Am^{3+}$, $Cm^{3+}$, $Ac^{3+}$, and the lanthanides present at low concentrations from source solutions containing a mixture of these desired metal ions with the ions one does not desire to remove which may be present in much greater concentrations in the source solution including hydrogen ions. The separation is effected in a separation device such as a column through which the source solution is flowed. The process of selectively removing and concentrating the desired metal ions is characterized by the ability to selectively and quantitatively complex the desired metal ions to the properly spaced polyhydroxypyridinone ligand portion of the solid support system, from a large volume of solution, even though the desired metal ions may be present at low concentrations. The desired ions thus separated can, optionally, be subsequently recovered from the separation column by flowing through it a small volume of a receiving phase which contains a solubilized reagent which need not be selective, but which will quantitatively dissociate the desired ions from the hydroxypyridinone ligands. The recovery of the desired metal ions from the receiving phase is easily accomplished by known procedures.

Moreover, the above described ligands covalently bonded to particulate solid supports as shown in Formula 7 provide a means for separating parts-per-billion (ppb) to parts-per-million (ppm) levels of $Fe^{3+}$ from 1% to 5% HF or $NH_4F$ by using the separation techniques described above. The solid supported ligands of this invention are also useful in separating Pu(IV), Th(IV), Zr(IV), and Hf(IV) from >1M nitric acid solutions and in separating other acid solutions of actinides and lanthanides containing large amounts of other cations. The above described solid supported ligands are also effective in separating Cu, Ni, Zn, Cd, Pb, Ag, Hg and others as wastes from less acidic feed streams such as potable water or industrial effluents.

DETAILED DESCRIPTION OF THE INVENTION

As summarized above, the present invention is drawn to novel properly spaced polyhydroxypyridinone-containing ligands covalently bound to particulate solid support materials to form the compositions of Formula 7. The invention is also drawn to the concentration and removal of certain desired metal ions, such as certain transition, post-transition, lanthanide and actinide metal ions, from other metal ions in water supplies and waste solutions, such as ions of Fe, Pu, Th, Zr, Hf, other lanthanides and actinides, Bi, and Sb from acidic and/or highly complexing or chelating matrices and Cu, Al, Ga, Ni, Zn, Cd, Pb, Ag, and Hg ions from slightly acidic to neutral pH matrices and other chelating matrices. Moreover, the above described ligands covalently bonded to particulate solid supports as shown in Formula 7 provide a means for separating ppb to ppm levels of Fe from concentrated 1% to 5% HF and $NH_4F$ by using the separation techniques described above. The process of the invention is particularly adaptable to recovery of metal ions from solutions containing large amounts of hydrogen ions and other ligating anions such as fluoride. Such solutions from which such ions are to be concentrated and/or recovered are referred to herein as "source solutions." In many instances the concentration of desired ions in the source solutions will be much less than the concentration of other metal ions from which they are to be separated.

The concentration of desired ions is accomplished by forming a complex of the desired ions with a polyhydroxypyridinone-containing ligand particulate solid support composition shown in Formula 7 and flowing a source solution containing the desired ions through a column packed with a polyhydroxypyridinone ligand-solid support composition to attract and bind the desired metal ions to the polyhydroxypyridinone ligand portion of such composition to form a ligand-metal ion complex, and subsequently dissociating the ligand-metal ion complex by flowing a receiving liquid in much smaller volume than the volume of source solution passed through the column to remove and concentrate the desired ions in the receiving liquid solution. The receiving liquid or recovery solution forms a stronger complex with the desired transition, post-transition lanthanide or actinide metal ions than does the polyhydroxypyridinone ligand and thus the desired metal ions are quantitatively stripped from the hydroxypyridinone ligand-containing solid support composition in concentrated form in the receiving solution. The recovery of desired metal ions from the receiving liquid can be accomplished by known methods.

EXAMPLES

The following examples illustrate the preferred embodiments of the invention that are presently best known. However, other embodiments may be made within the scope of the disclosure. In certain of the examples, reaction schemes are given that are general in nature and reference to the text of each example may be necessary to clarify each reactant, reaction step, reaction condition and product obtained. Reactants utilized and/or products prepared are identified by the number of the example followed by an alphabetical designation in which each was first used, i.e. "1A" is the first reactant or product identified in Example 1, "1B" is the second, etc. All NMR spectra were obtained on QE 300 (300 MHZ) spectrophotometer.

Example 1

Preparation of 1-hydroxy-2-(1H)-pyridinone-6-carboxylic acid (1C).

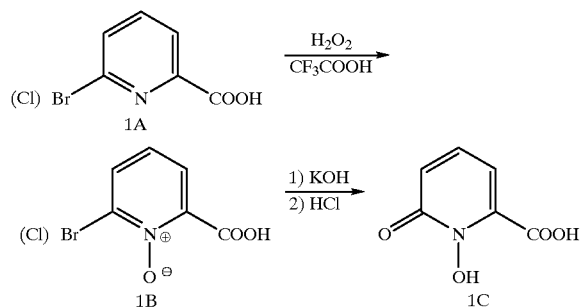

The starting material used for this reaction can be either 6-chloro or 6-bromo-pyridine-2-carboxylic acid. The chloro derivative is preferred and is illustrated here. A 643 g (4.08 mole) portion of 6-chloro-pyridine-2-carboxylic acid (1A) was added to a solution of 10.6 L of $CF_3COOH$ and 1530 mL of 30% $H_2O_2$ and heated to 80° C. for 6.5 hrs. The reaction mixture was concentrated to about 2100 mL by rotary evaporation and then added to 1 L of water. The product immediately precipitated as a finely divided, white crystalline solid. It was isolated by filtration, washed with water, and dried in vacuo. This yielded 687 g of 2-chloropyridine-2-carboxylic acid (1B), mp 180° C. dec. $^1$HNMR (DMSO-$d_6$): S 8.20 (m.2H), 7.80 (m,1H), -2.70 (broad S, 1H).

A 687 g (3.96 mole) portion of the 2-chloro-pyridine-6-carboxylic acid (1B) prepared above was dissolved in 15 L of a 10% aqueous KOH solution, and the resulting solution was maintained at 80° C. overnight and then cooled in an ice bath and treated with 7.2 L of concentrated HCl. The white suspended solid was isolated by filtration, washed with dilute HCl followed by three 1.3 liter portions of water, and then dried in vacuo to yield 530 g (86%) of 1-hydroxy-2-(1H)-pyridinone-6-carboxylic acid (1C). mp 216° C. dec. $^1$HNMR (DMSO-d6): S 13.02 (broad s, 2H), 7.44 (m, 1H), 6.73 (d, J=9.5 Hz, 1H), 6.65 (d, J=7.5 Hz, 1H).

Examples 2–4 illustrate the preparation of ligand carriers.

Example 2

Preparation of tetrakis(aminomethyl)methane (TAM) (2C)

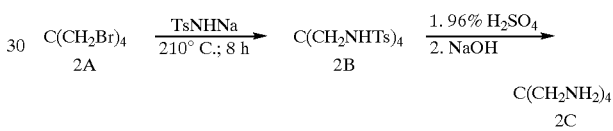

A 250-mL three-necked reaction flask, equipped with a mechanical stirrer and a thermometer, was heated in an oil bath to 210° C. Pentaery-thrityl tetrabromide (2A) was ground well with the sodium salt of p-toluenesulfonamide and added in four (equal) amounts to the preheated reaction vessel while stirring. The reaction mixture formed a viscous melt within 40 minutes (oil bath 230° C. by electro-thermometer). The melt was maintained under stirring at 210° C. for 8 hrs. Pentaerythrityl tetrabromide sublimity on the cooler parts of the reaction flask was melted down occasionally by pumping hot oil from the oil bath. The reaction mixture was cooled to 180° C. under stirring and then allowed to cool to room temperature. Acetic acid (70% v/v, 60 mL) was added to the reaction flask equipped with a reflux condenser and the contents refluxed until the hard reaction mixture disintegrated into a fine white suspension. The mixture was washed several times with hot water to remove sodium bromide and p-toluenesulfonamide. The resulting white crystalline powder weighed 50 g (62%) and was found to be pure tetratosylate of TAM (2B). mp 248° C. $^1$HNMR ($CHCl_3$): S 7.70 (d, J=9.0 Hz, 8H), S 7.33 (d, J=9.0 Hz, 8H), 5.40 (t, J=6.7 Hz, 4H, NH), 2.68 (d, J=6.7 Hz, 8H), 2.44 (S, 12H).

Concentrated sulfuric acid was taken in a three-necked flask equipped with a mechanical stirrer and heated to 160° C. in an oil bath. The powdered tosylate (2B) from above was added in small lots over 40 minutes. The tosylate dissolved immediately to form a clear solution and the temperature rose to 180° C. The reaction mixture was maintained at 180° C. for 30 minutes. After cooling to room temperature and pouring into 30% v/v ethanol, the white crystalline solid formed was allowed to settle. The supernatant was decanted off and the precipitate was dissolved in a minimum amount of 10% sodium hydroxide and filtered to remove any insoluble material. The filtrate was evaporated to dryness. The residue was treated with methanol and the solid was filtered off and the filtrate was evaporated to dryness with the help of toluene. The pure TAM product (2C) was obtained by distillation at 110° C./0.4 mm Hg in yield of 76% (2.50 g). mp 70° C. $^1$H NMR (CDCl$_3$): S 2.58 (S, 8H), 1.11 (S, 8H, NH$_2$).

Example 3

Preparation of tetrakis (5-amino-2-oxa-pentyl) methane (3C)

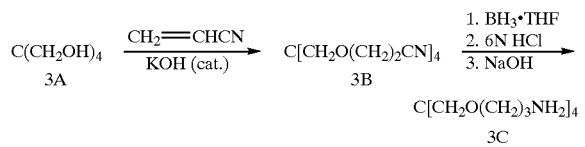

A mixture of 13.62 g (0.10 mole) of pentaerythritol (3A) and 1 g of a 40% Ag/KOH catalyst was stirred while 42.45 g (0.80 mole) of acrylonitrile was added at a rate such that the temperature did not exceed 35° C. The mixture was stirred an hour after all the acrylonitrile was added and poured into 200 mL of water. The resulting mixture was stirred for one hour, which allowed the excess acrylonitrile to polymerize completely. The polymer was removed by filtration and washed with chloroform. The chloroform layer was washed with water two times more and dried over MgSO$_4$. The crude tetranitrile product (3B) (30 g) was produced by the evaporation of chloroform and directly used for the next reaction without further purification. $^1$HNMR (CDCl$_3$): S 3.78 (t, J=6.0 Hz, 8H), 3.59 (S, 8H), 2.69 (t, J=6.0 Hz, 8H).

To a solution of the crude tetranitrile (3B) (30 g, 0.10 mole) in HPLC grade THF (6.5 L) was added dropwise BH$_3$ (1M in THF, 1.4 L, 1.4 mole) under nitrogen. The reaction mixture was heated at 70° C. overnight. After being cooled, the solution was carefully quenched by the addition of water, and the mixture was stirred for 30 minutes at room temperature. The solvent was then distilled off, and the solid residue was heated to reflux in 6N HCl (800 mL) for 3 hrs while being cooled with an ice-water bath, and the acidic solution was basified to pH 13 with solid NaOH. The water was evaporated to dryness and the tetramine product (3C) was extracted with methanol from the residue. The methanol solution was evaporated to dryness again and trace water was removed by azeotropic distillation with toluene. The residue was treated with CH$_2$Cl$_2$ and filtered. The filtration was dried over K$_2$IO$_3$. After filtration, the methylene chloride solution was evaporated to dryness. The pure tetrakis (5-amino-2-oxapentyl)methane (3C) was obtained by distillation under vacuo at 210° C./0.3 mmHg in a yield of 34% (10.7 g). $^1$HNMR (CDCl$_3$): S 3.43 (t, J=6.0 Hz, 8H), 3.35 (S, 8H), 2.76 (t, J=6.6 Hz, 8H), 1.67 (m, 8H).

Example 4

Preparation of 25,26,27,28-tetrakis [(aminobutyl) oxy]Calix[4]arene (4D).

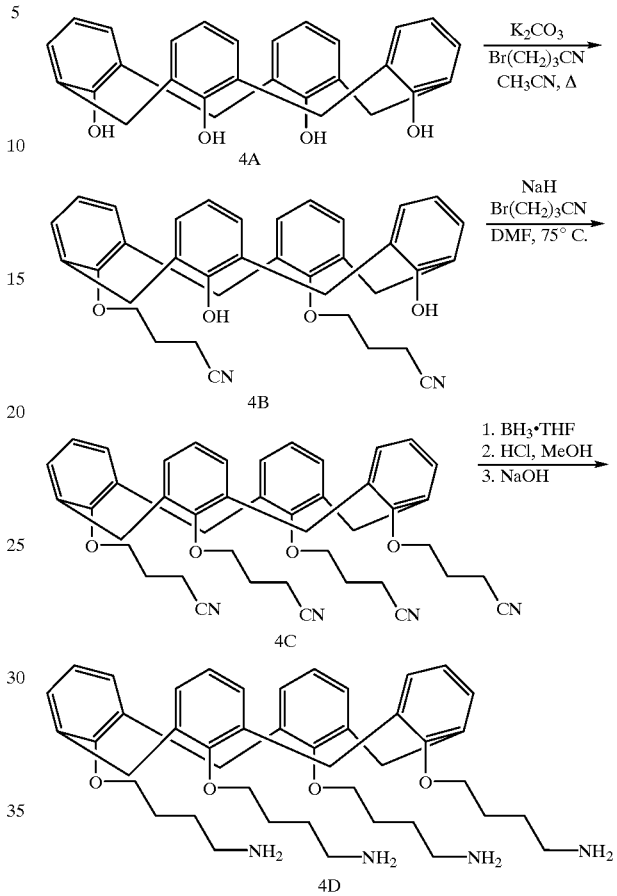

Calix[4]arene (4A) (3.56 g, 85 mmol), 4-bromobutyronitrile (2.60 g, 17.6 mmol), and potassium carbonate (1.39 g, 10.1 mmol) was refluxed in CH$_3$CN (100 mL) for 5 days. The solvent was evaporated and the residue was taken up in CH$_2$Cl$_2$ (400 mL), washed with 1 N HCl (100 mL), H$_2$O (60 mL), and brine (60 mL), and dried with MgSO$_4$. The CH$_2$Cl$_2$ was evaporated and the residue was recrystallized from CHCl$_3$/MeOH yielding a white solid 25,27-bis[(cyanopropyl)oxy]-26,28-dihydroxycalix[4]arene product (4B). Yield: 2.61 g (56%). $^1$HNMR (CDCl3): S 7.80 (S, 2H, OH), 7.20 (d, J=7.2 Hz, 4H), 6.92 (d, J=7.2 Hz, 4H), 6.75 (t, J=7.2 Hz, 2H), 6.66 (t, J=7.2 Hz, 2H), 4.18 (d, J=12.6 Hz, 4H) 4.10 (t, J=6.6 Hz, 4H), 3.42 (d, J=12.6 Hz, 4H), 3.10 (t, J=6.6 Hz, 4H), 2.40 (m, 4H).

NaH (1.13 g, 44.7 mmol) and the above 25,27-bis [(cyanopropyl)oxy]-26,28-dihydroxycalix[4]arene (4B) (2.50 g, 4.5 mmol) was stirred for 1 hr. at room temperature in DMF (100 mL). 4-Bromobutyronitrile (6.63 g, 44.7 mmol) was added and the mixture was stirred at 75° C. for 20 hrs. The DMF was evaporated and the residue was taken up with CH$_2$Cl$_2$ (200 mLs) and washed with 1 N HCl (100 mL×2), saturated NH$_4$Cl in H$_2$O (100 mL×3), and saturated NaCl in H$_2$O (100 mL), and dried with MgSO$_4$. After filtration, the CH$_2$Cl$_2$ was evaporated and the residue was purified by silica gel column (CH$_2$Cl$_2$/MeOH=250/)1 and then recrystallized from MeOH with a yield of 0.43 g (15%) yield 25,26,27,28-tetrakis[(cyanopropyl)oxy]calix[4]arene (4C). $^1$HNMR (CDCl$_3$): 6.64 (S, 12H), 4.32 (d, J=12.4 Hz, 4H), 4.05 (t, J=6.5 Hz, 8H), 3.24 (d, J=12.4 Hz, 4H) 2.60 (t, J=6.5 Hz, 8H), 2.20 (m, 8H).

A mixture of the tetranitrile (4C) (0.43 g, 0.62 mmol) and 1M BH$_3$ in THF (10 mL, 10 mmol) was refluxed overnight. After being cooled, the solution was carefully quenched by the addition of water, and the mixture was stirred for 30 minutes at room temperature. The solvent was then distilled off, and the solid residue was heated to 65° C. in conc. HCl (10 mL) and MeOH (10 mL) for 2 hrs. After being cooled with an ice-water bath, the acidic solution was basified to pH~13 with 2 N NaOH. After removal of CH$_3$OH, the product was extracted with CH$_2$Cl$_2$ from the aqueous solution. The CH$_2$Cl$_2$ solution was dried with Na$_2$SO$_4$. After filtering, the filtrate was evaporated to dryness to yield 0.36 g (82%) of 25,26,27,28-tetrakis[(aminobutyl)oxy]calix[4]arene. $^1$H NMR (CDCL3): 7.10–6.10 (m, 12H), 4.22 (d, J=12.2 Hz, 4H), 4.06–3.58 (m, 16H), 3.32–2.78 (m, 12H), 2.10–1.08 (m, 16H). FAB mass spectrum, tm/e 732 (M$^+$+Na, 18), 710 (M$^+$+H, 46), 661 (M$^+$ CH$_2$CH$_2$CH$_2$NH$_2$+H+Na, 41), 639 (M$^+$ CH$_2$CH$_2$CH$_2$NH$_2$+2H, 100).

Examples 5–9 illustrate the preparation of tris(HOPO) amine ligands.

Example 5

Preparation of the Tris-HOPO-Amine Ligands

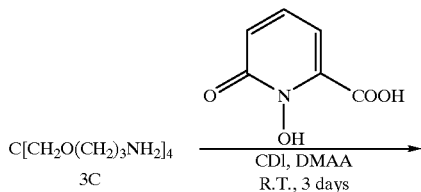

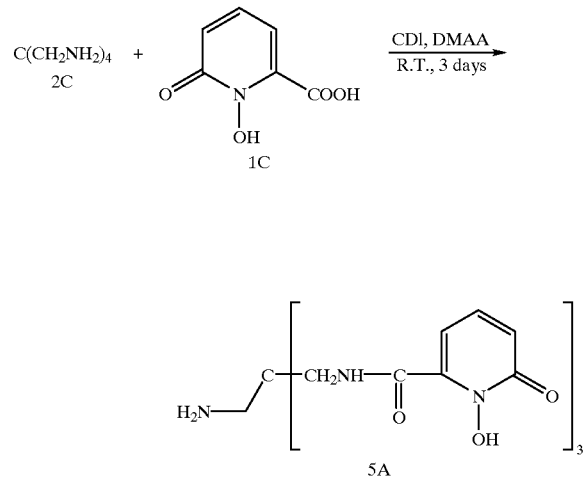

A solution of 1-hydroxy-2-(1H)-pyridinone-6-carboxylic acid (1C) (1.55 g, 10 mmol) from Example 1 in DMAA (50 mL) was stirred for 20 minutes. A solution of CDI (1.62 g, 10 mmol) in DMAA (50 mL) was added dropwise into the above solution. The mixture was stirred for 2 hrs. at room temperature. The ligand carrier tetrakis (aminomethyl) methane (2C) (0.38 g, 2.9 mmol) from Example 2 was added. The amidation reaction was allowed to go at room temperature for three days. The solvent was evaporated and the residue was dissolved in water (20 mL), then treated with THF (200 mL) to precipitate the tris(HOPO)amine ligand (5A) shown above. The solid was collected and washed with CHCl$_3$. After drying under vacuum at 50° C., the ligand (5A) 1-aminoethyl-2[tris(6-methyleneaminocarboxy-1-hydroxy-2-(1H)pyridinone)] weighed 1.35 g. $^1$HNMR (DMSO-d6): 9.50 (broad S, 3H), 7.46–7.26 (m, 3H), 6.70–6.50 (m, 6H), 3.52–2.94 (m, 8H), 2.40 (S, 5H).

Example 6

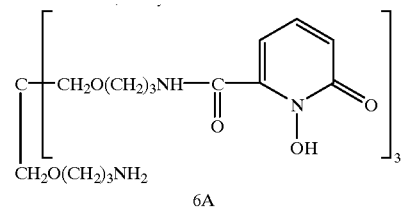

A solution of 1-hydroxy-2-(1H)-pyridinone-6-carboxylic acid (1C) (96.65 g, 0.62 mol) from Example 1 in DMAA (5.5 L) was stirred for 20 minutes and then a solution of CDI (103 g, 0.623 mol) in DMAA (400 mL) was added dropwise over half an hour. The mixture was stirred at room temperature for 2 hrs. The ligand carrier, tetrakis (5-amino-2-oxypentyl)methane (3C) 65.07 g, 0.178 mol) from Example 3 was added and the amidation reaction was allowed to carry out at room temperature for three days according to the reaction scheme shown above. The solvent was evaporated under vacuum at 60° C. and the residue was dissolved in 100 mL of methanol. Ethyl ether was poured into the methanol solution to precipitate the crude tris(HOPO)amine ligand product (6A). After being decanted the oily product was treated with a mixture of methanol and chloroform (1/1) and the insoluble impurity was filtered off. The filtrate was evaporated to dryness to afford 152 g of the purified tris (HOPO)amine ligand (6A). $^1$HNMR (DMSO-d6): S 9.20 (broad m, 3H), 8.40 (broad S, 3H), 7.34–7.15 (m, 3H), 6.54–6.32 (m, 6H), 3.48–3.18 (m, 24H), 2.88 (m, 2H), 1.84–1.58 (m, 8H).

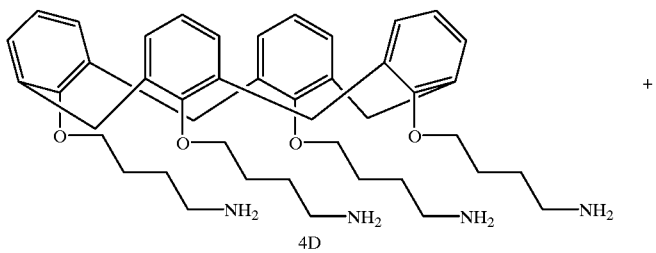

4D

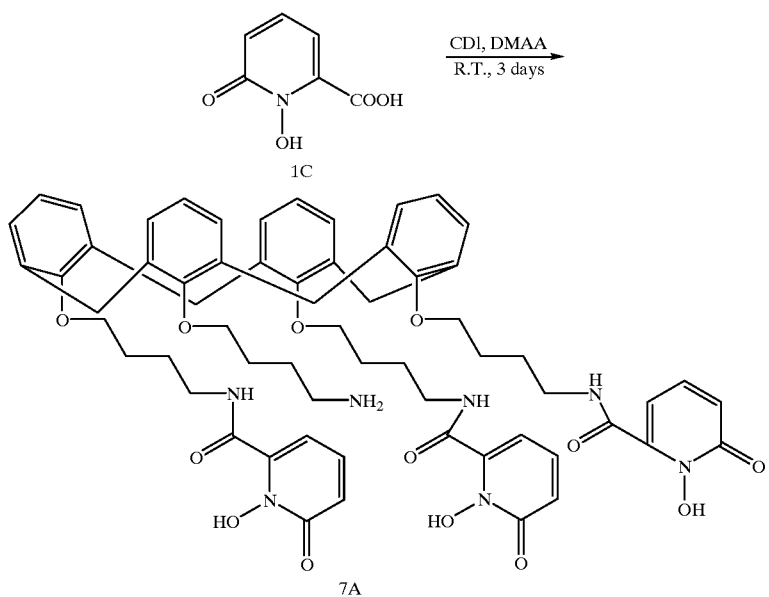

7A

A solution of 1-hydroxy-2-pyridinone-6-carboxylic acid (1C) (0.29 g, 1.78 mmol) from Example 1 in DMAA (30 mL) was stirred for 20 minutes and then a solution of CDI (0.29 g, 1.78 mmol) in DMAA (30 mL) was added dropwise. The mixture was stirred at room temperature for 2 hrs. A solution of the carrier ligand 25,26,27,28-tetrakis [(aminobutyl)oxy]calix[4]arene (4D) (0.36 g, 0.51 mmol) from Example 4 in DMAA (20 mL) was added and the reaction was allowed to carry out at room temperature for three days as shown in the above reaction scheme. The solvent was evaporated under vacuum at 60° C. and the residue was treated with ethyl ether. After being decanted, the oily residue was dissolved in CHCl$_3$. Any insoluble impurity was removed by filtration and the filtrate was concentrated to dryness to afford 0.62 g of the purified tris(HOPO)amine ligand (7A). $^1$HNMR (CDCl$_3$): S 7.68 (m, 3H), 7.32–6.16 (m, 21H), 4.32 (m, 4H), 4.00–3.02 (m, 23H), 2.28 (broad S, 2H), 2.14–1.40 (m, 12H).

Example 8

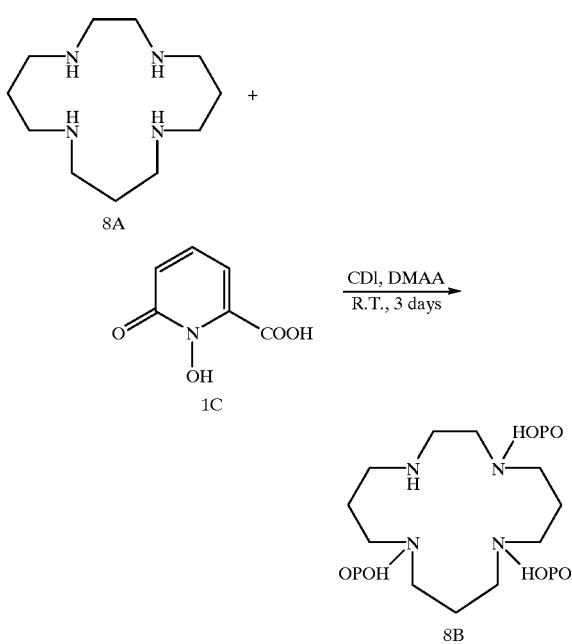

A solution of 1-hydroxy-2-(1H)-pyridinone-6-carboxylic acid (1C) (1.55 g, 10 mmol) from Example 1 in DMAA (50 mL) was stirred for 20 min. Then a solution of DCI (1.62 g, 10 mmol) in DMAA (50 mL) was added dropwise. The mixture was stirred at room temperature for 2 hrs. A solid ligand carrier, 1,4,8,12-tetraazacyclopentadecane, (8A) (0.61 g, 2.9 mmol) was added and the amidation reaction was allowed to carry out at room temperature for three days as shown in the above reaction scheme. The tris(HOPO) cyclam ligand (8B), as shown, results from the amidation reaction between the 6 carboxylic acid on the HOPO ring with three of the N—H functionalities of the tetraazacyclopendadecane. The solvent was evaporated under vacuum at 60° C. and the residue was treated with methanol. The solid was collected and washed with methanol and chloroform. After being dried under vacuum at 50° C. it afforded 1.96 g of tris(HOPO)cyclam ligand (8B). $^1$HNMR (DMSO-16): 7.42–7.04 (m, 3H), 6.56–5.98 (m, 6H), 3.8–2.56 (m, 20H), 2.12–1.60 (m, 6H).

A solution of 1-hydroxy-2-(1H)-pyridinone-6-carboxylic acid (1C) (1.55 g, 10 mmol) from Example 1 in DMAA (50 mL) was stirred for 20 minutes and then a solution of CDI (1.62 g, 10 mmol) in DMAA (50 mL) was added dropwise. The mixture was stirred at room temperature for 2 hrs. Triethylenetetraamine (9A) (0.42 g, 2.86 mmol) was added as the ligand carrier and the resulting mixture was allowed to stir at room temperature for three days as shown in the above reaction scheme. Ligand 9B, as shown, results from the amidation reaction between the 6 carboxylic acid on the HOPO ring with three of the N—H functionalities of the triethylenetetramine. The solvent was evaporated under vacuum at 60° C. and the residue was dissolved into a small amount of methanol. The tris(HOPO)tetraamine (9B) was precipitated by adding ethyl ether into the above methanol solution. After being decanted, the oily product was dissolved in a mixture of methanol and chloroform (1/1). After being filtered, evaporation of solvents give 1.45 g of the tris(HOPO)tetraamine ligand (9B). $^1$HNMR (DMSO-d6)= 9.60 (S 1H) 7.42–7.19 (m, 3H), 6.58–6.25 (m, 6H) 3.74–2.96 (m, 14H), 2.82–2.62 (m, 2H).

Examples 10–12 show the attachment of a HOPO ligand to a solid support by means of a covalent linkage.

Example 9

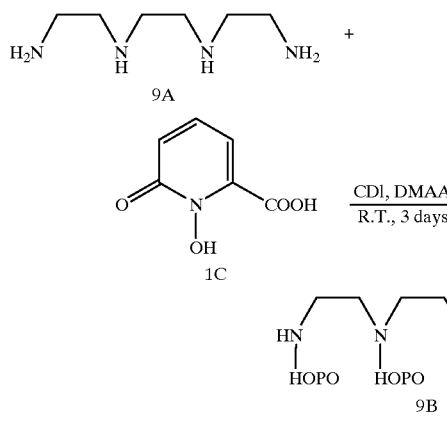

Example 10

Attachment of a tris(HOPO)tetramine ligand onto silica gel

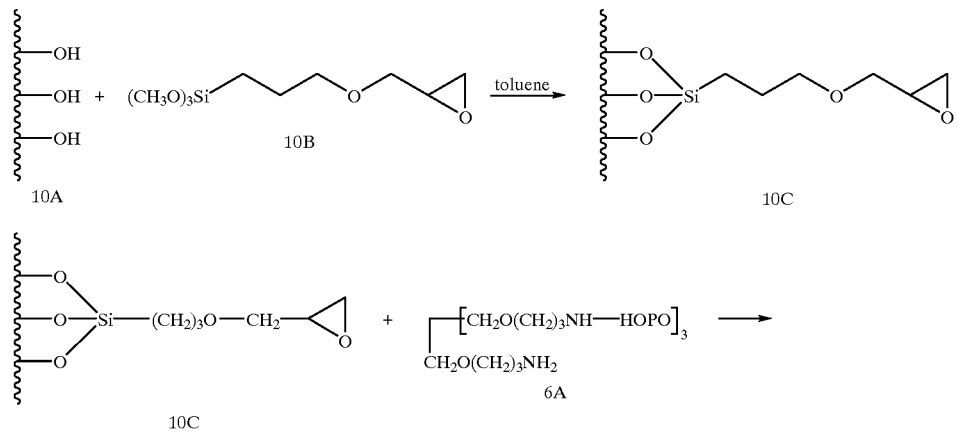

-continued

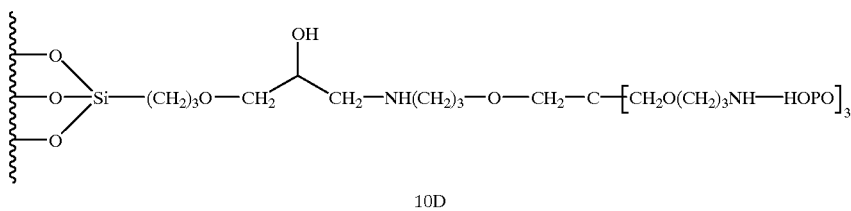

10D

A mixture of silica gel (10A) (35–60 mesh, 28.2 g) in toluene (110 ml) was refluxed with 3-glycidoxypropyltrimethoxysilane (10B) (13.33 g, 56.4 mmol) overnight. The functionalized silica gel (10C) was collected by filtration and washed with MeOH. After being dried in vacuum at 50° C. overnight it was ready for the ligand attachment.

A mixture of the functionalized silica gel (10C) (1 g) and the tri(HOPO)tetramine ligand (6A) of Example 6 in water was gently stirred at 50° C. for three days. The resulting product (10D) was collected by filtration and washed with water and MeOH. After being dried at 50° C. in vacuum the composition was ready for analytical testing.

The composition (10D) prepared by this Example corresponds to Formula 7 wherein SS is silica gel, A is a silane linkage (Formula 8), X is a glycidoxypropyl spacer (Formula 9 where a is 3, b is 1 and $R^1$ is OH) and $L(HOPO)_3$ is the tris(HOPO)tetramine ligand of Example 6.

Example 11

Attachment of tris(HOPO)tetramine onto polyacrylate beads.

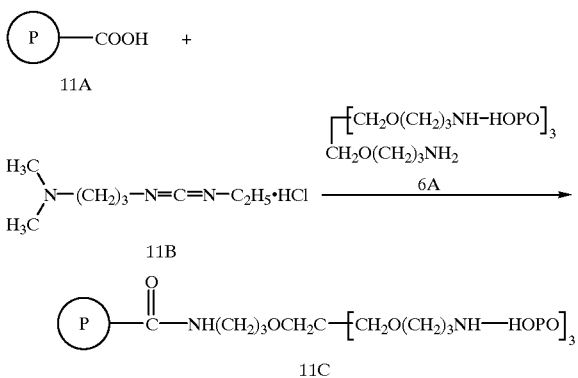

Polyacrylate beads (11A) were activated as follows. The pH of 50 mL of double distilled water was adjusted to between 4.9 and 5.1 with 4-morpholine ethane sulfonic acid. One gram of polyacrylate beads (11A) were then added to the above solution. Then 0.35 g of 1-(3-dimethylaminopropyl)-3-ethylcarbodiimide hydrochloride (EDC) (11B) was added. After 5 minutes another 0.35 g portion of EDC was added. After being stirred for 15 minutes at room temperature, the activated beads were collected by filtration and were ready for the ligand attachment.

The activated beads were plunged into 0.1M of the tris(HOPO)tetramine of Example 6 (6A) in 25 mL of water and gently stirred overnight. The ligand loaded beads were collected by filtration and washed with water, then MeOH. After being dried, the ligand containing beads (11C) were ready for analytical testing.

The composition (11C) prepared by this Example corresponds to Formula 7 wherein SS is polyacrylate, A and X are represented by the carbonyl group (Formula 10 where d is 0, c is 1, e is 0 and Y is carbonyl) covalently bonding SS to the $L(HOPO)^3$ ligand which is the tris(HOPO)tetramine ligand of Example 6.

Example 12

Attachment of tris(HOPO)tetramine onto polystyrene beads

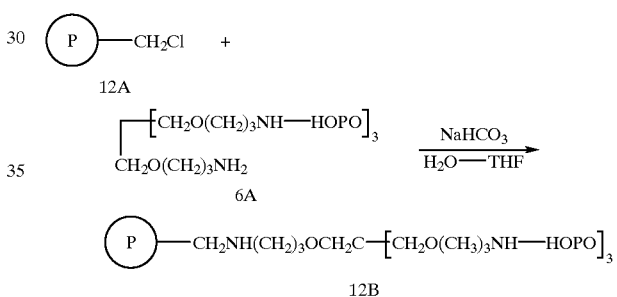

A mixture of activated polystyrene beads (1.0 g, 2 mmol Cl) and tris(HOPO)tetramine (6A) (1.55 g, 2 mmol) in water (7 ml) and THF (14 ml) was gently stirred with $NaHCO_3$ (0.85 g, 10 mmol) at 50–55° C. for three days. The ligand loaded polystyrene beads (12B) were collected by filtration and washed with water and MeOH. After being dried, the ligand containing beads (12B) were ready for analytical testing.

The composition (12B) prepared by this Example corresponds to Formula 7 wherein SS is polystyrene, A and X are represented by the methylene group (Formula 10 where d is 1, c is 0 and e is 0), covalently bonding SS to the $L(HOPO)_3$ ligand which is the tris(HOPO)tetramine ligand of Example 6.

The process of selectively and quantitatively concentrating and removing a desired ion or group of desired ions present at low concentrations from a plurality of other undesired ions in a multiple ion source solution in which the undesired ions may be present at much higher concentrations comprises bringing the multiple ion containing source solution into contact with a polyhydroxypyridinone-containing particulate solid support material shown in Formula 7 which causes the desired metal ion(s) to complex with the polyhydroxypyridinone portion of the composition and subsequently breaking or stripping the desired ion from the complex with a receiving solution which forms a stronger complex with the desired ions than does the polyhydroxypyridinone ligand. The receiving or recovery solution contains only the desired metal ions in a concentrated form. Preferably the hydroxypyridinone ligand solid support composition will be contained in a column wherein the source and receiving solutions can flow through by gravity. If desired, the flow rate of these solutions can be increased by applying pressure (with a pump) on the top of the column or by applying a vacuum in the receiving vessel.

The hydroxypyridinone-ligand solid support functions to attract the desired metal cations according to Formula 11

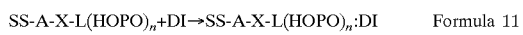
SS-A-X-L(HOPO)$_n$+DI→SS-A-X-L(HOPO)$_n$:DI  Formula 11

Except for DI, Formula 8 is the same as Formula 7 wherein SS stands for solid support, A is a covalent linkage mechanism, X is a hydrophilic spacer grouping, and L(HOPO)$_n$ is a ligand comprising a ligand carrier L, n is an integer of 3 to 6 and L stands for a polyhydroxypyridinone-containing ligand. DI stands for desired ion being removed.

Once the desired metal ions are bound to the polyhydroxypyridinone-containing ligand, they are subsequently separated by use of a smaller volume of a receiving liquid according to Formula 12:

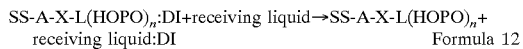
SS-A-X-L(HOPO)$_n$:DI+receiving liquid→SS-A-X-L(HOPO)$_n$+
receiving liquid:DI  Formula 12

The preferred embodiment disclosed herein involves carrying out the process by bringing a large volume of the source multiple ion solution into contact with a polyhydroxypyridinone ligand-solid support composition of Formula 7 in a separation column through which the mixture is first flowed to complex the desired metal ions (DI) with the polyhydroxypyridinone ligand-solid support composition as indicated by Formula 11 above, followed by the flow through the column of a smaller volume of a receiving liquid, such as aqueous solutions of HBr, HCl, EDTA, NH$_3$, NaCl, NaI, HNO3, H$^+$ and others which either form a stronger complex with the desired metal ion than does the hydroxypyridinone-containing ligand bound to the particulate solid support and/or have greater affinity for the bound ligand under these conditions than does the desired ion. In this manner, the desired metal ions are carried out of the column in a concentrated form in the receiving solution. The degree or amount of concentration will obviously depend upon the concentration of desired metal ions in the source solution and the volume of source solution to be treated. The specific receiving liquid being utilized will also be a factor. Generally speaking, the concentration of desired transition, post-transition or actinide metal ions in the receiving liquid will be from 20 to 1,000,000 times greater than in the source solution. Other equivalent apparatus may be used instead of a column, e.g., a slurry which is filtered and then washed with a receiving liquid to break the complex and recover the desire metal ion(s). The concentrated desired metal ions are then recovered from the receiving phase by known procedures.

Illustrative of desired transition metal ions which have strong affinities for polyhydroxypyridinone-containing ligands bound to solid supports are Fe(III) from concentrated 1% to 5% HF and NH$_3$; Pu(IV), Th(IV), Zr(IV) and Hf(IV) from nitric acid solutions; Cu(II), Zn(II), Ni(II), Cd(II), Ni(II), Pb(II), Ag(I), Hg(II) from less acidic feed streams; and 3+ actinides, lanthanides, Al(III), Ga(III) from slightly acidic solutions. This listing of preferred cat ions is not comprehensive and is intended only to show the types of preferred metal ions which may be bound to polyhydroxypyridinone-containing ligands attached to solid supports in the manner described above.

Removal of Desired Molecules With Cation-Ligand-Matrix Compositions

The following examples demonstrate how the polyhydroxypyridinone-containing ligand bound to a solid support composition of Formula 7 may be used to concentrate and remove desired ions. The polyhydroxypyridinone ligand-containing solid support composition is placed in a column. An aqueous source solution containing the desired metal ion or ions, in a mixture of other metal ions which may be in a much greater concentration, is passed through the column. The flow rate for the solution may be increased by applying pressure with a pump on the top of the column or by applying a vacuum in the receiving vessel. After the source solution has passed through the column, a much smaller volume of a recovery solution, i.e., an aqueous solution which has a stronger affinity for the desired metal ions than does the polyhydroxypyridinone-containing ligand, is passed through the column. This receiving solution contains only the desired metal ions in a concentrate form for subsequent recovery. As noted above, suitable receiving solutions can be selected from the group consisting of HBr, HI, HCl, NaI, NaCl, NaBr, Na$_4$EDTA, Na$_3$NTA, NH$_3$, NH$_4$OH, ethylenediamine and mixtures thereof. The preceding listing is exemplary and other receiving solutions may also be utilized, the only limitation being their ability to function to remove the desired metal ions from the polyhydroxypyridinone ligands.

The following examples of separations and recoveries of transition metal ions by the inorganic support-bound hydroxypyridinone-containing ligands which were made as described in Examples 10 through 12 are given as illustrations. These examples are illustrative only, and are not comprehensive of the many separations of metal ions that are possible using the materials of Formula 7.

Example 13

A 0.1 g column (6 mm diameter×8 mm height) of ligand-containing silica beads from Example 10 was prepared. The column was cleaned with two aliquots of 5 mll of 98% H$_2$SO$_4$ followed by two aliquots of 18.2 MΩ H$_2$O at ~0.1 ml/min. The column was then loaded with 20 ml of 0.05M Zr(IV) as the NO$_3^-$ salt in 5M HNO$_3$. The Zr was reduced from a 5 ppm feed input level to a <1 ppm output level. The Zr removed by the column was then quantitatively recovered (within analytical error) in 5 ml of 98% H$_2$SO$_4$ eluant at a flowrate of ~0.1 ml/min. The Zr analysis was performed using Inductively Coupled Plasma Spectroscopy, (ICP).

Example 14

The procedure of Example 13 was repeated, using the ligand-containing acrylate beads of Example 11 in a 6 mm×12 mm column. The Zr was reduced from a 5 ppm level in the feed to a <1 ppm exiting level and the Zr was quantitatively recovered in the 98% $H_2SO_4$ eluant.

Example 15

The procedure of Example 14 was repeated, using the ligand-containing acrylate beads of Example 11 in a 6 mm×12 mm column but with 10 ml of Fe(III) in 0.5% HF as the feed solution and using 37% HCl as the cleaning and elution solution. Graphite Furnace Atomic Absorption Spectroscopy was used for the analysis. The 1 ppm Fe in the feed was reduced to <0.1 ppm Fe in the output and the Fe was quantitatively recovered (within analytical error) in the 37% HCl eluting solution.

From the foregoing, it will be appreciated that the inorganic solid support bound polyhydroxypyridinone-containing ligands of Formula 7 of the present invention provide a material useful for the separation and concentration of the transition, post-transition and actinide metal cations from mixtures of those cations with other metal cations, $H^+$ and soluble complexes such as $F^-$. The metal ions can then be recovered from the concentrated recovery solution by standard techniques known in the art. Similar examples have also been successfully established for many other transition metal ions.

The variety of $L(HOPO)_n$ ligands described by Formula 7 show significant improvement in interaction strength for several specific separations such as Fe from HF. However, particular spacing of the hydroxypyridinone moieties aids in obtaining even greater interaction strengths. For example, the ligands of Examples 6, 7, and 8 have greater Fe(III) binding strength under the same conditions than those of Examples 5 and 9. Hence, optimal use of the invention in some cases also includes particular spacings compared to others. Such may be readily determined through routine experimentation by one skilled in the art. Additionally, in a minority of cases, such as the complexing of very low concentrations of iron in the presence of high concentrations of fluoride, not all 6 coordination sites may be involved in the complexing of iron. In cases such as this, for example, the iron may bind to only 4 of the coordination sites leaving 2 fluorides bound. However, the ligand is still fully complexed with iron and fluoride and is functional for purposes of the present invention.

Although the invention has been described and illustrated by reference to certain specific solid support-bound polyhydroxypyridinone-containing ligands of Formula 7 and processes of using them; analogs, as above defined, of these hydroxypyridinone-containing ligands are within the scope of the compositions and processes of the invention as defined in the following claims.

What is claimed is:

1. A composition for selectively binding metal ions comprising a polyhydroxypyridinone-containing ligand covalently bonded to a particulate solid support through a hydrophilic spacer having the formula:

SS-A-X-L(HOPO)$_n$ where SS is a particulate solid support, A is a covalent linkage mechanism, X is a hydrophilic spacer grouping, L is a ligand carrier, HOPO is a hydroxypyridinone appropriately spaced on the ligand carrier to provide a minimum of six functional coordination metal binding sites, and n is an integer of 3 to 6 with the proviso that when SS is a particulate organic polymer, A-X may be combined as a single covalent linkage.

2. A composition according to claim 1 wherein ligand carrier L is configured such that there are at least two atoms on carrier L separating the attached HOPO groups to provide the appropriate stereoconfiguration to optimize the HOPO metal binding sites.

3. A composition according to claim 2 wherein HOPO is a member selected from the group consisting of 3-hydroxy-2(1H)-pyridinone, 1-hydroxy-2(1H)-pyridinone and 3-hydroxy-4(1H)-pyridinone covalently bonded to ligand carrier L through a functionality other than the hydroxy or carbonyl moieties on the pyridinone ring.

4. A composition according to claim 3 wherein SS is a inorganic solid support selected from the group consisting of sand, silica gel, glass, glass fibers, alumina, zirconia, titania, and nickel oxide and combinations thereof.

5. A composition according to claim 4 wherein A is a member selected from the group consisting of Si(Z,Z)-O, wherein Z can independently represent members selected from the group consisting of Cl, Br, I, lower alkyl, lower alkoxy, substituted lower alkyl or substituted lower alkoxy and O-SS.

6. A composition according to claim 5 wherein X is a member represented by the formula:

wherein $R^1$ is a member selected from the group consisting of H, SH, OH, lower alkyl, and aryl; a is an integer from 3 to about 10; and b is an integer of 0 or 1.

7. A composition according to claim 3 wherein SS is a particulate polymeric organic solid support matrix selected from the group consisting of polyacrylate, polystyrene, and polyphenol and combinations thereof.

8. A composition according to claim 7 wherein A and X combined are represented by the formula:

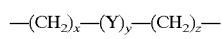

where y is an integer of 0 or 1; x and z are independently integers between 0 and 10; and Y is member selected from the group consisting of O, S, C=N, CO, CONH, CSNH, COO, CSO, NH, NR, SO, $SO_2$, $SO_2NH$, $C_6H_4$ and $CH_2C_6H_4$ where R is lower alkyl with the proviso that at least one of x, y and z must be at least 1.

9. A composition according to claims 6 or 8 where L is a polyamine carrier.

10. A composition according to claim 9 wherein each HOPO group on the L carrier is separated by at least four non-hydrogen atoms.

11. A composition according to claim 10 wherein y is 1 and Y is CONH.

12. A composition according to claim 10 where n is 3.

13. A composition according to claim 10 where n is 4.

* * * * *